(12) United States Patent
Goerend

(10) Patent No.: US 8,776,757 B2
(45) Date of Patent: Jul. 15, 2014

(54) TRANSMISSION FLUID PAN

(76) Inventor: David J. Goerend, Saint Lucas, IA (US)

( * ) Notice: Subject to any disclaimer, the term of this patent is extended or adjusted under 35 U.S.C. 154(b) by 388 days.

(21) Appl. No.: 13/346,020

(22) Filed: Jan. 9, 2012

(65) Prior Publication Data

US 2012/0186554 A1     Jul. 26, 2012

Related U.S. Application Data

(60) Provisional application No. 61/435,869, filed on Jan. 25, 2011.

(51) Int. Cl.
*F01M 11/03* (2006.01)
*F02B 77/00* (2006.01)
*F16N 31/00* (2006.01)
*F16H 57/04* (2010.01)
*F01M 11/04* (2006.01)
*F01M 11/00* (2006.01)

(52) U.S. Cl.
CPC ........... *F01M 11/0004* (2013.01); *F16N 31/00* (2013.01); *F16H 57/0452* (2013.01); *F01M 11/04* (2013.01)

USPC ................. 123/195 C; 123/196 R; 180/69.1; D15/150

(58) Field of Classification Search
USPC .................. 123/195 C, 196 R; 184/1.5, 6.24; 180/69.1; D15/150
See application file for complete search history.

(56) References Cited

U.S. PATENT DOCUMENTS

| | | | | |
|---|---|---|---|---|
| 1,761,930 A | * | 6/1930 | McCuen | 184/6.24 |
| 2,577,188 A | * | 12/1951 | Hall | 184/106 |
| 3,800,914 A | * | 4/1974 | Miyata | 184/6.25 |
| 5,863,424 A | * | 1/1999 | Lee | 210/167.02 |
| 6,237,720 B1 | * | 5/2001 | Sutton | 123/195 C |

\* cited by examiner

*Primary Examiner* — Noah Kamen
(74) *Attorney, Agent, or Firm* — McKee, Voorhees & Sease, P.L.C

(57) ABSTRACT

A transmission or engine pan is provided for holding the lubricating fluid. A plug is removably installed in a drain hole in the bottom of the pan to allow the fluid to be drained. The floor of the pan slopes to the drain hole. The bottom wall of the pan may have a tapered thickness from the side walls to the drain hole, or may have a constant thickness. The bottom exterior of the pan is flat, or alternatively may include ribs which define a horizontal surface for receiving a jack.

20 Claims, 7 Drawing Sheets

TRANSMISSION FLUID PAN

CROSS-REFERENCE TO RELATED APPLICATIONS

This application claims priority under 35 U.S.C. §119 to provisional application Ser. No. 61/435,869 filed Jan. 25, 2011, herein incorporated by reference in its entirety.

BACKGROUND OF THE INVENTION

A transmission typically has a pan mounted beneath the transmission for collecting the transmission lubricant, fluid or oil. Engines also use a pan for lubricant collection. Conventional transmission and engine pans are stamped or pressed from sheet metal so as to have a bottom wall with flat exterior and interior surfaces. The flat, horizontal bottom allows the transmission to easily receive a jack for lifting the transmission. However, the flat floor of the pan inhibits drainage of fluid when the drain plug in the bottom of the pan is removed. Also, the horizontally disposed floor allows build up of debris on the interior surface of the flat bottom wall. Such debris may get recirculated with the transmission oil, which eventually is detrimental to the transmission or engine.

Therefore, a primary objective of the present invention is the provision of an improved transmission or engine pan to enhance drainage of fluid from the pan when the drain plug is removed.

Another objective of the present invention is the provision of an improved for transmissions or engine pan which inhibits collection of debris across the interior bottom surface of the pan.

A further objective of the present invention is the provision of an improved transmission or engine pan having a sump for collection of debris.

Still another objective of the present invention is the provision of an improved transmission or engine pan which precludes recirculation of debris through the transmission.

Another objective of the present invention is the provision of an improved transmission or engine pan having a sloped floor for improved drainage and debris removal.

Still another objective of the present invention is the provision of an improved transmission and engine pan having an outlet opening at the lowest point of the floor of the pan when the pan is mounted on the transmission or engine.

A further objective of the present invention is the provision of an improved transmission and engine pan having a horizontal exterior bottom for receiving a jack.

Yet another objective of the present invention is the provisions of a transmission or engine pan which is economical to the manufacturer and durable in use.

These and other objectives become apparent from the following description of the invention.

SUMMARY OF THE INVENTION

The improved transmission fluid pan of the present invention includes a bottom wall with a sloped interior surface leading to a drain opening for improved drainage of fluid and debris from the pan when the plug is removed from the drain opening. In the preferred embodiment, the exterior surface of the pan bottom is flat and horizontal so as to be adapted to receive a floor jack. The thickness of the bottom wall may be varied or tapered from the perimeter edge or side walls of the pan to the drain opening, so that the exterior bottom of the pan is maintained horizontal. Alternatively, the bottom wall thickness may be constant, with ribs provided on the bottom exterior surface to form a horizontal base for receiving the jack.

DETAILED DESCRIPTION OF THE PREFERRED EMBODIMENTS

Figure 1:
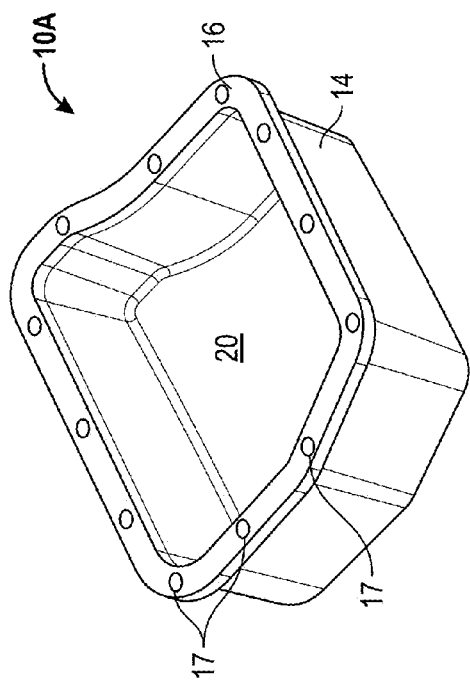
FIG. 1 is a perspective view of a first embodiment of the improved transmission pan of the present invention.
Figure 3:
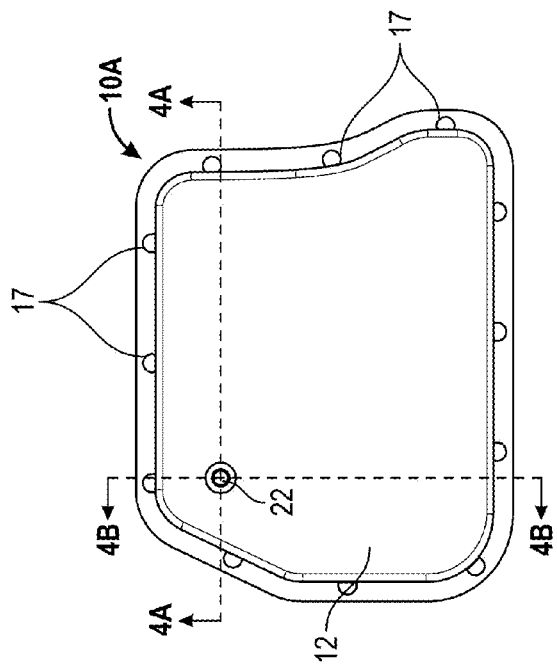
FIG. 3 is a bottom plan view of the pan.

In FIGS. 1-4, the transmission pan of the present invention is generally designated in the drawings by the reference numeral 10A. The pan 10A has a bottom wall 12, a continuous side wall 14 and an upper flange or lip 16 for bolting to the transmission housing or casing via the bolt holes 17 in flange 16. In the first embodiment, the exterior surface of the bottom wall 12 is flat so that a jack can be positioned beneath the pan 10A to lift the transmission.

Figure 2:
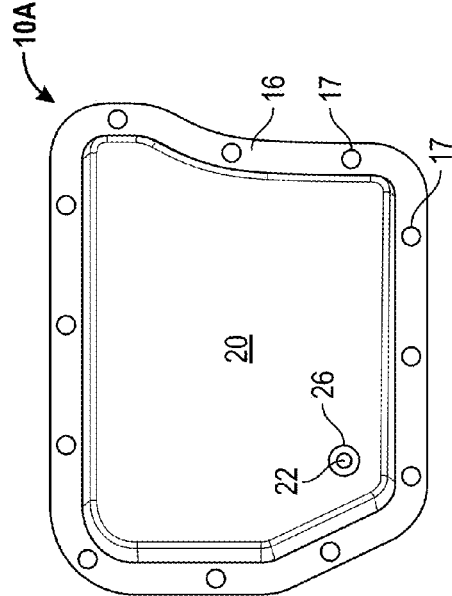
FIG. 2 is a top plan view of the pan.
Figure 4A:
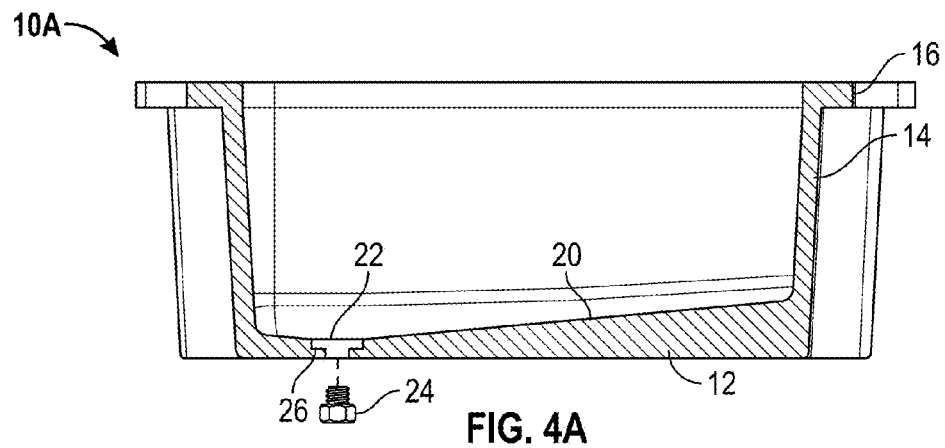
FIG. 4A is a sectional view of the pan taken along lines 4A-4A of FIG. 3, and showing the internal sloped floor.
Figure 4B:
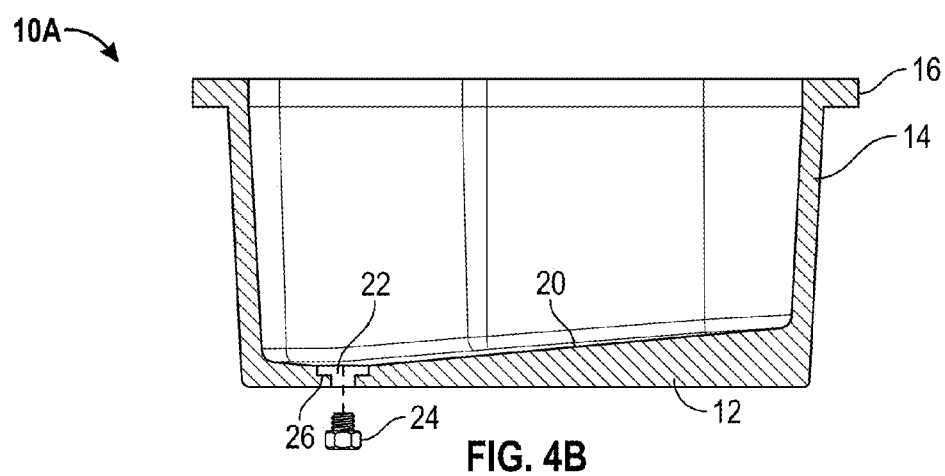
FIG. 4B is a sectional view of the pan taken along lines 4B-4B of FIG. 3, and showing of the internal sloped floor.
Figure 5:
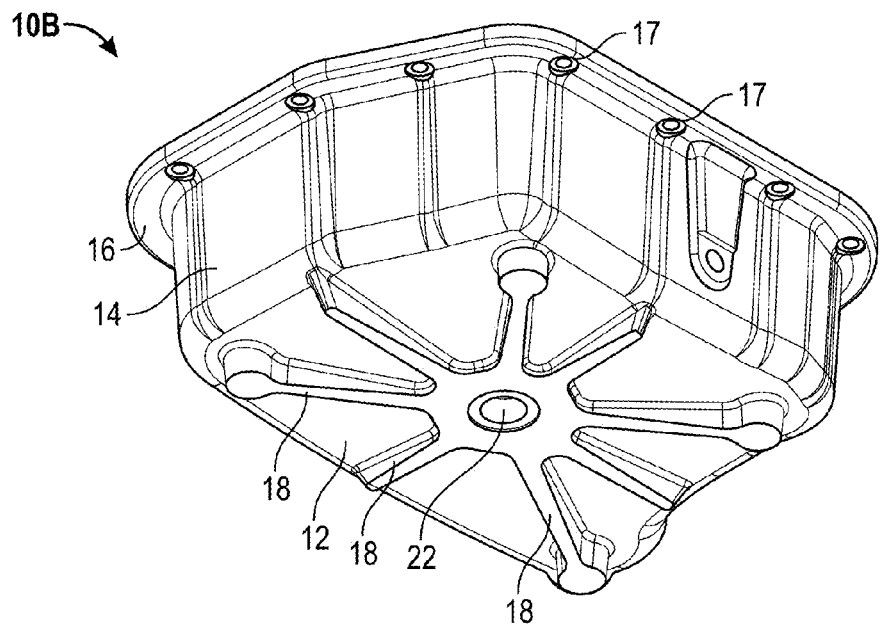
FIG. 5 is a bottom perspective view of an alternative embodiment of an improved transmission pan according to the present invention.
Figure 6:
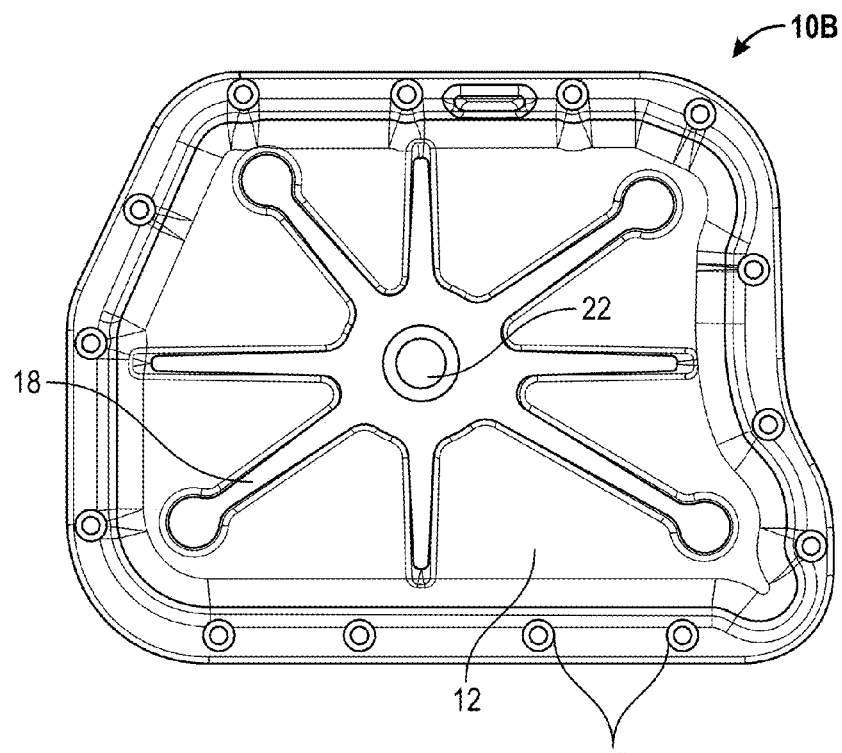
FIG. 6 is a bottom plan view of the alternative embodiment shown in FIG. 5.
Figure 7:
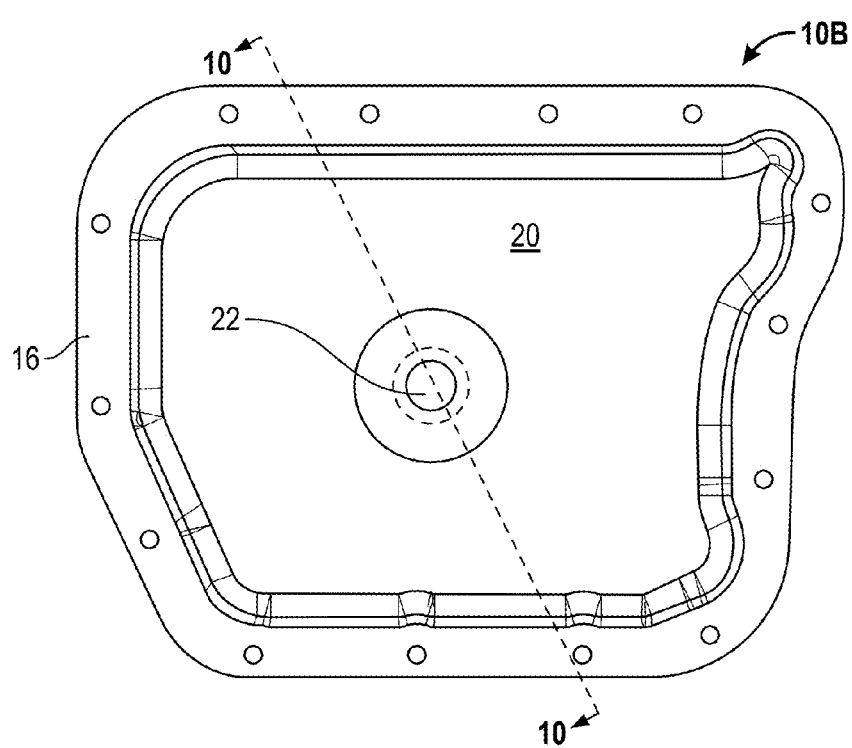
FIG. 7 is a top plan view of the alternative embodiment shown in FIG. 5.
Figure 8:
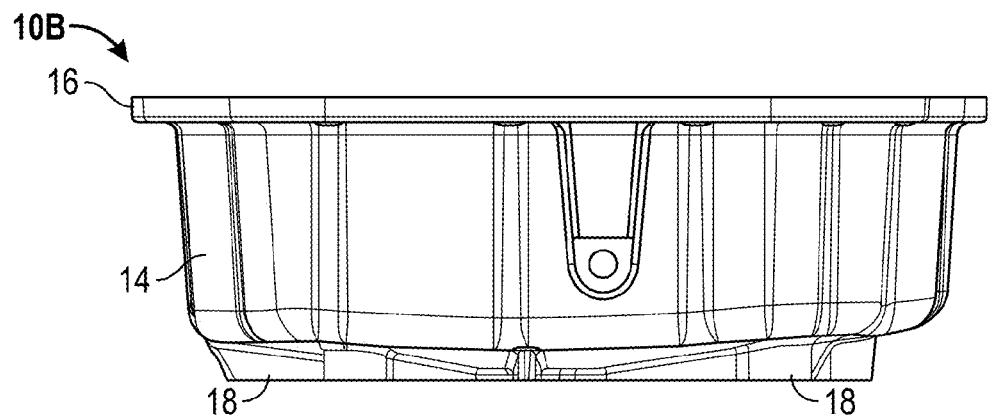
FIG. 8 is a side elevation view of the alternative embodiment shown in FIG. 5.
Figure 9:
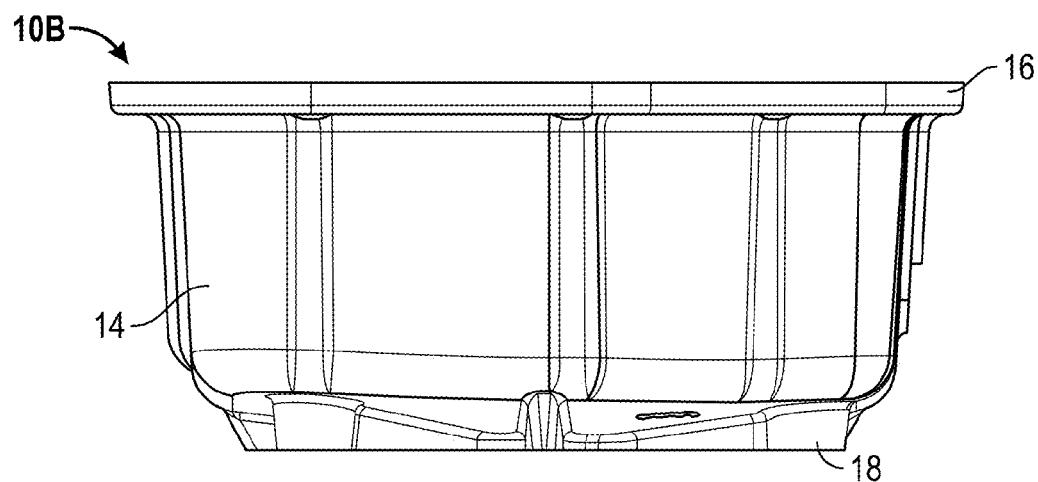
FIG. 9 is an end elevation view of the alternative embodiment shown in FIG. 5.
Figure 10:
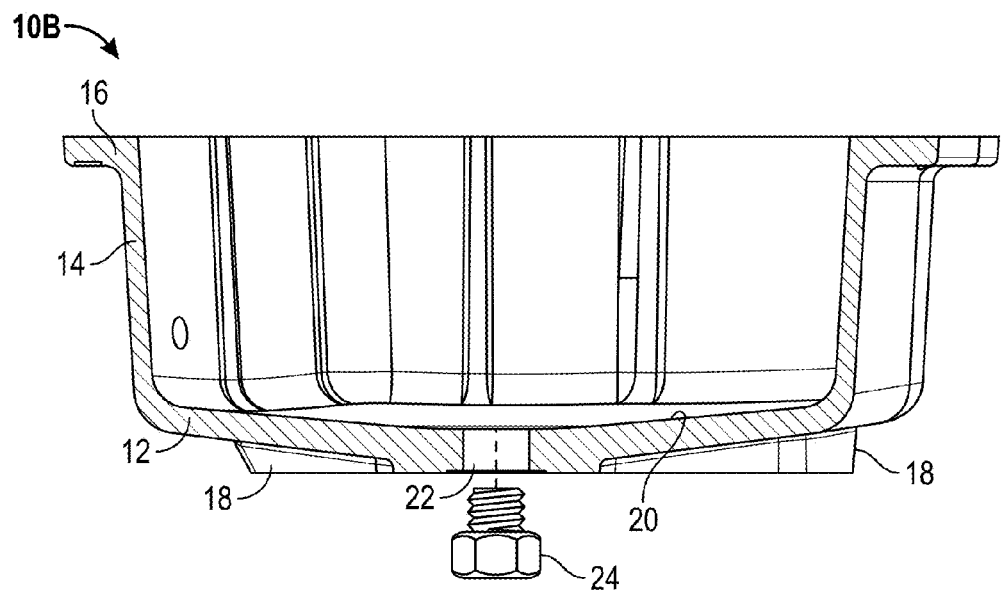
FIG. 10 is a sectional view taken along lines 10-10 of FIG. 7.
Figure 11:
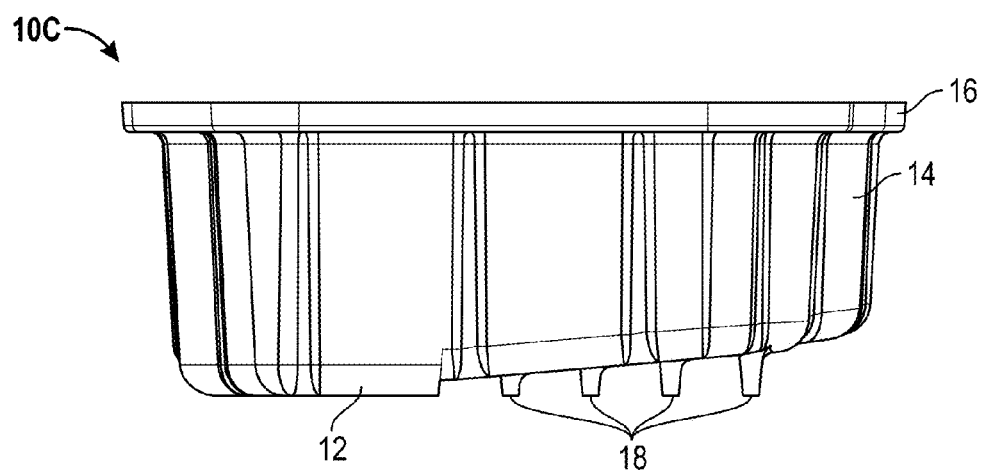
FIG. 11 is a side elevation view of a third embodiment of the improved transmission fluid pan according to the present invention.
Figure 12:
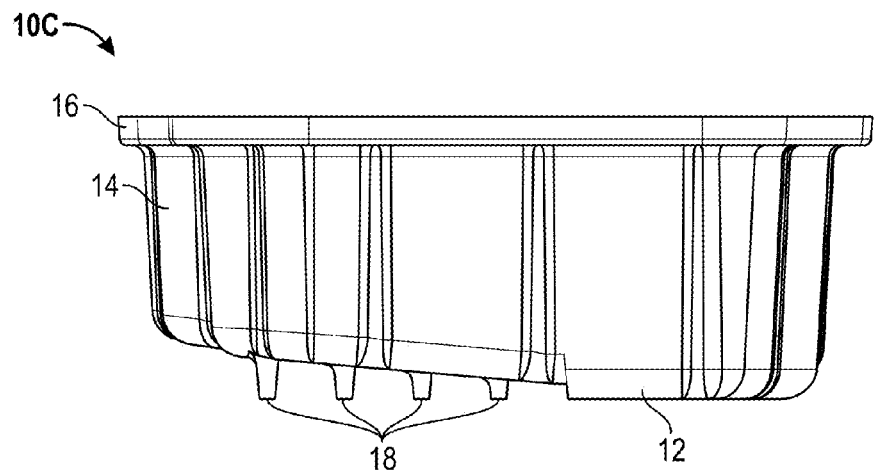
FIG. 12 is a view from the opposite side of the pan shown in FIG. 11.
Figure 13:
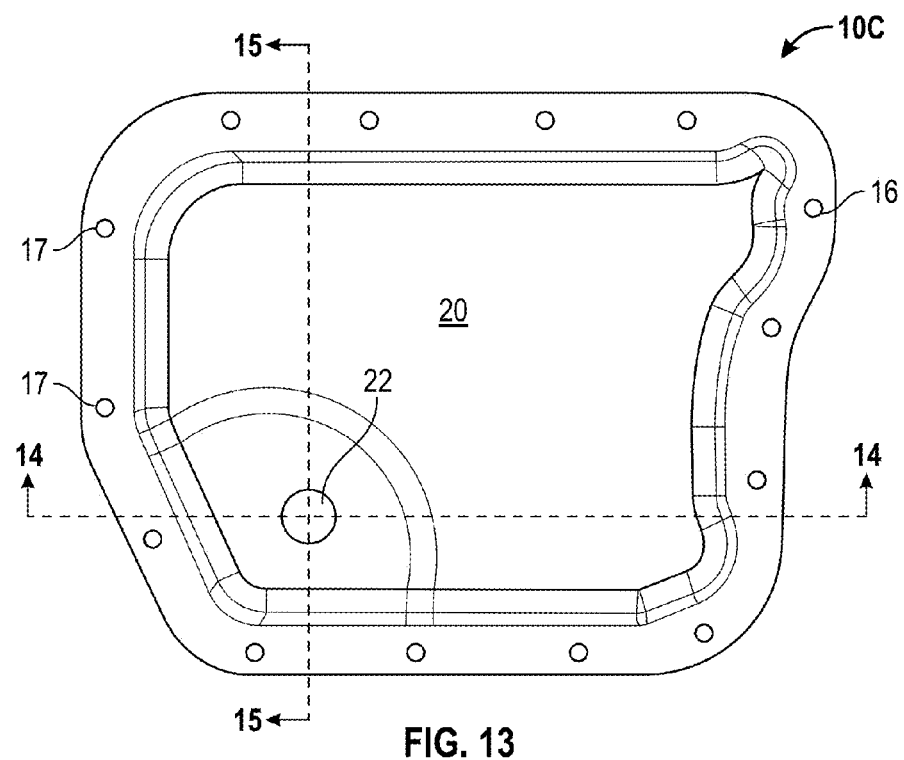
FIG. 13 is a top plan view of the pan shown in FIG. 11.
Figure 14:
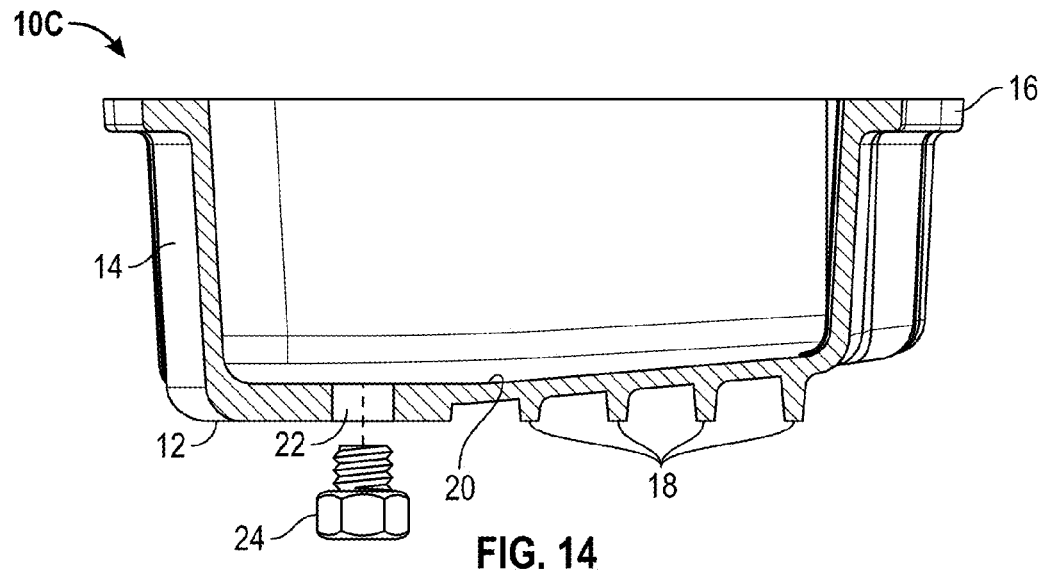
FIG. 14 is a sectional view taken along lines 14-14 of FIG. 13.
Figure 15:
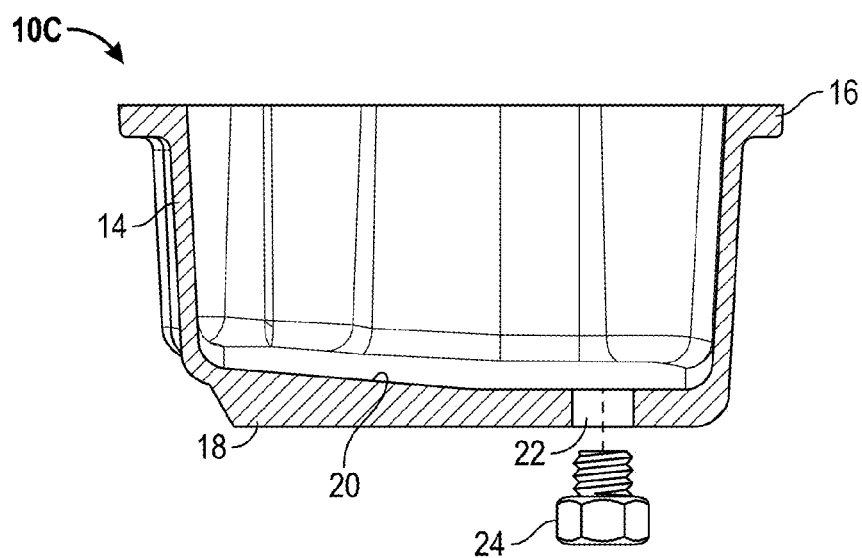
FIG. 15 is a sectional view taken along lines 15-15 of FIG. 13.

The pan 10A includes an internal floor 20 which is sloped toward a drain hole or outlet 22. The floor 20 may have various embodiments or profiles, all of which slope to the drain 22. For example, the floor 20 may be smooth, as seen in FIG. 2, or may have grooves (not shown) formed therein to direct transmission fluid to the drain 22. The floor 20 may be formed in a single plane, multiple planes, or a curved surface, all of which provide gravity drainage of the transmission fluid to the drain opening 22. Thus, the floor 20 has the highest elevation at the furthest point from drain 22.

A removable drain plug 24 is provided for the drain opening 22. Preferably, the drain opening 22 and the plug 24 are threadably coupled from the exterior of the pan.

The pan 10A may also include a recess or sump 26 around the drain opening to collect debris. A screen (not shown) may be provided so as to cover the sump 26 and may be secured or fastened to the floor 20 in any convenient manner. The sump 26 and the screen inhibit backflow or migration of debris into the transmission housing.

The FIGS. 1-4, 5-10 and 11-15 show three different embodiments for the pan 10A, 10B and 10C, respectively, with the bottom wall 14 of the pan 10 may be formed in different configurations for each embodiment. For example, as seen in the cross-sectional view of FIGS. 4A and 4B, the bottom wall 12 of the pan 10A is tapered or sloped from the perimeter edges adjacent the side walls 14 to the drain opening 22, and the bottom exterior surface is flat so as to be substantially horizontal when the pan 10A is mounted to the transmission, such that the bottom of the pan 10 can receive a jack. In the configuration of FIGS. 5-15, the bottom wall 12 has a constant thickness, and ribs 18 are provided or formed on the exterior bottom surface so as to provide a flat, horizontal surface for a jack. As seen in FIGS. 5-10, the ribs 18 extend substantially across the full area of the bottom wall 12. In the embodiment shown in FIGS. 11-15, a portion of the exterior surface of the bottom wall 12 is flat and horizontal, with the remaining portion being sloped, and ribs 18 provided beneath the sloped portion of the bottom wall 12 such that a jack can be positioned beneath the pans 10B and 10C.

In use, transmission lubricant or fluid flows by gravity along the floor 20 towards the drain opening 22 for easy drainage when the plug 24 is removed. Heavy particles and debris collect in the sump 26 and also drain from the opening 22 when the plug 24 is removed. The jack can be placed beneath the pan 10 on the flat bottom 12 of pan 10A or on the ribs 18 of pans 10B and 10C, for easy lifting of the transmission, without slippage.

While the above description of the invention relates to an improved pan for a transmission, it is understood that a similarly improved pan for an engine is within the scope of the present invention.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. An improved transmission pan for collecting transmission fluid, comprising:
    a pan having a bottom wall and upright side walls;
    a drain opening in the bottom of the pan;
    a drain plug removable mounted in the drain opening; and
    the bottom wall having interior and exterior surfaces, with the interior surface defining a floor sloping downward to the drain opening and exterior surface forming a horizontal plane extending substantially between the side walls to receive a jack for raising the transmission pan.
2. The improved transmission pan of claim 1 wherein the walls define a corner with the drain opening being adjacent the corner.
3. The improved transmission pan of claim 1 wherein the floor is smooth.
4. The improved transmission pan of claim 1 wherein the floor is planar.
5. The improved transmission pan of claim 1 wherein the drain opening defines a lowest point of the floor.
6. The improved transmission pan of claim 1 wherein the interior and exterior surfaces of the bottom wall define a wall thickness which increases from a narrowest point at the drain opening to a thickest point furthest from the drain opening.
7. The improved transmission pan of claim 1 wherein the bottom wall includes a sump adjacent the drain opening.
8. The improved transmission pan of claim 7 further comprising a screen covering the sump.
9. The improved transmission pan of claim 1 wherein the floor has grooves leading to the drain opening.
10. The improved transmission pan of claim 1 wherein the bottom wall is substantially horizontal when the pan is mounted to the transmission.
11. The improved transmission pan of claim 1 further comprising ribs on the exterior surface of the bottom wall with the ribs forming a substantially horizontal planar jack surface when the pan is mounted on the transmission.
12. An engine oil pan, comprising:
    a bottom wall;
    a side wall extending upwardly from the bottom wall;
    a lip around the side wall to mount the pan to the engine;
    a drain hole in the bottom wall;
    a plug removably mounted to the drain hole; and
    the bottom wall having an inner floor surface sloping from the side wall to the drain hole and an outer surface forming a horizontal plane extending substantially beneath the sloping inner floor surface to receive a jack.
13. The engine oil pan of claim 12 wherein the bottom wall has a tapered thickness.
14. The engine oil pan of claim 12 wherein the bottom wall has a substantially constant thickness.
15. The engine oil pan of claim 12 wherein the lower surface is substantially horizontal when the pan is mounted to the engine.
16. The engine oil pan of claim 12 wherein the bottom wall has the lower surface includes spaced apart ribs.
17. The engine oil pan of claim 16 wherein the ribs form a planar surface.
18. The engine oil pan of claim 17 wherein the planar surface is substantially horizontal when the pan is mounted to the engine.
19. The engine oil pan of claim 12 further comprising a sump surrounding the drain hole.
20. The engine oil pan of claim 12 wherein the floor has a recess surrounding the drain opening.

* * * * *